United States Patent
Maher et al.

(10) Patent No.: US 6,910,141 B2
(45) Date of Patent: *Jun. 21, 2005

(54) PIPELINED DATA PROCESSOR WITH SIGNAL-INITIATED POWER MANAGEMENT CONTROL

(75) Inventors: Robert Maher, Carrollton, TX (US); Raul A. Garibay, Jr., Plano, TX (US); Margaret R. Herubin, Coppell, TX (US); Mark Bluhm, Carrollton, TX (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/784,835

(22) Filed: Feb. 23, 2004

(65) Prior Publication Data

US 2004/0172572 A1 Sep. 2, 2004

Related U.S. Application Data

(62) Division of application No. 10/216,615, filed on Aug. 9, 2002, now Pat. No. 6,721,894.

(51) Int. Cl.[7] ................................. G06F 1/26
(52) U.S. Cl. ............... 713/323; 713/310; 713/322; 713/324; 712/220
(58) Field of Search .................... 713/300, 310, 713/320, 322, 323, 324, 340, 321; 712/205, 208, 214, 216, 220, 244; 710/305; 711/100

(56) References Cited

U.S. PATENT DOCUMENTS

| | | | |
|---|---|---|---|
| 3,678,463 | A | 7/1972 | Peters |
| 4,204,249 | A | 5/1980 | Dye et al. |
| 4,267,577 | A | 5/1981 | Hashimoto et al. |
| 4,293,927 | A | 10/1981 | Hoshii |

(Continued)

FOREIGN PATENT DOCUMENTS

| | | |
|---|---|---|
| EP | 0167853 | 6/1984 |
| EP | 0172344 | 2/1986 |
| EP | 0201020 | 4/1986 |
| EP | 0242010 | 1/1987 |

(Continued)

OTHER PUBLICATIONS

U.S. Appl. No. 10/784,396, filed Feb. 23, 2004, Maher.
U.S. Appl. No. 10/784,672, filed Feb. 23, 2004, Maher.
U.S. Appl. No. 10/784,834, filed Feb. 23, 2004, Maher.
U.S. Appl. No. 10/784,846, filed Feb. 23, 2004, Maher.
U.S. Appl. No. 10/784,702, filed Feb. 23, 2004, Maher.
Design and Electronik, "186–Processors with Low Current Drain Modules," vol. 23, Nov. 5, 1991, p. 8.
European Search Report dated Jul. 28, 1993 for E/93302399.
Intel, "Intel 82347 Power Management PC Peripheral," Oct. 1990, pps. 1–55–1–80.
Intel, "386 DX Microprocessor Programmer's Reference Manual" 1990, pp. 4–6 and 8–4.
Intel, 386 SL Microprocessor SuperSet, 386 SL Microprocessor System Design Guide 1990, Introduction to the SL Superset, Chapter 1, pp. 1–1 through 1–3, System and Power Management, Chapter 14, pp. 14–1 through 14–23, Sep. 1990.
Texas Instruments, TMS320C25, User's Guide, "Digital Signal Processor Products," Preliminary, 1986.

*Primary Examiner*—Thuan Du
(74) *Attorney, Agent, or Firm*—Vedder Price Kaufman & Kammholz, P.C.

(57) ABSTRACT

A pipelined data processor with signal-initiated power management control in which a plurality of subcircuits, including pipeline subcircuitry, and circuitry for generating and controlling at least one clock signal are responsive to at least one control signal by disabling a clock signal to the pipeline subcircuitry.

130 Claims, 3 Drawing Sheets

U.S. PATENT DOCUMENTS

| | | |
|---|---|---|
| 4,312,035 A | 1/1982 | Greene |
| 4,316,247 A | 2/1982 | Iwamoto |
| 4,317,180 A | 2/1982 | Lies |
| 4,317,181 A | 2/1982 | Teza et al. |
| 4,381,552 A | 4/1983 | Nocilini et al. |
| 4,395,756 A | 7/1983 | Daniels |
| 4,409,665 A | 10/1983 | Tubbs |
| 4,417,320 A | 11/1983 | Ei |
| 4,481,581 A | 11/1984 | Johnson |
| 4,545,030 A | 10/1985 | Kitchin |
| 4,570,219 A | 2/1986 | Shibukawa et al. |
| 4,573,117 A | 2/1986 | Boney |
| 4,590,553 A | 5/1986 | Noda |
| 4,615,005 A | 9/1986 | Maejima et al. |
| 4,616,335 A | 10/1986 | Howe, Jr. et al. |
| 4,653,018 A | 3/1987 | Stadlmeier et al. |
| 4,698,748 A | 10/1987 | Juzswik et al. |
| 4,720,811 A | 1/1988 | Yamaguchi et al. |
| 4,748,559 A | 5/1988 | Smith et al. |
| 4,750,112 A * | 6/1988 | Jones et al. ............. 712/217 |
| 4,758,945 A | 7/1988 | Remedi |
| 4,766,567 A | 8/1988 | Kato |
| 4,780,843 A | 10/1988 | Tietjen |
| 4,796,235 A | 1/1989 | Sparks et al. |
| 4,825,407 A | 4/1989 | Loessel et al. |
| 4,835,728 A | 5/1989 | Si et al. |
| 4,835,737 A | 5/1989 | Herrig et al. |
| 4,841,440 A | 6/1989 | Yonezu et al. |
| 4,851,987 A | 7/1989 | Day |
| 4,893,271 A | 1/1990 | Davis et al. |
| 4,907,150 A | 3/1990 | Arroyo et al. |
| 4,980,836 A | 12/1990 | Carter et al. |
| 5,021,950 A | 6/1991 | Nishikawa |
| 5,021,983 A | 6/1991 | Nguyen et al. |
| 5,025,387 A | 6/1991 | Frane |
| 5,036,493 A | 7/1991 | Nielsen |
| 5,070,450 A | 12/1991 | Holman, Jr. et al. |
| 5,083,266 A | 1/1992 | Watanabe |
| 5,086,387 A | 2/1992 | Arroyo et al. |
| 5,142,684 A | 8/1992 | Perry et al. |
| 5,167,024 A | 11/1992 | Smith et al. |
| 5,175,853 A | 12/1992 | Kardach et al. |
| 5,189,647 A | 2/1993 | Suzuki et al. |
| 5,203,003 A | 4/1993 | Donner |
| 5,218,704 A | 6/1993 | Watts, Jr. et al. |
| 5,222,239 A | 6/1993 | Rosch |
| 5,237,699 A | 8/1993 | Little et al. |
| 5,241,680 A | 8/1993 | Cole et al. |
| 5,247,655 A | 9/1993 | Khan et al. |
| 5,276,889 A | 1/1994 | Shiraishi et al. |
| 5,291,542 A | 3/1994 | Kivari et al. |
| 5,297,263 A * | 3/1994 | Ohtsuka et al. ............. 712/244 |
| 5,339,446 A | 8/1994 | Yamasaki et al. |
| 5,355,503 A | 10/1994 | Soffel et al. |
| 5,361,364 A | 11/1994 | Nagashige et al. |
| 5,361,392 A | 11/1994 | Fourcroy et al. |
| 5,369,771 A | 11/1994 | Gettel |
| 5,388,265 A | 2/1995 | Volk |
| 5,390,350 A | 2/1995 | Chung et al. |
| 5,392,441 A | 2/1995 | Brasher et al. |
| 5,396,635 A | 3/1995 | Fung |
| 5,404,546 A | 4/1995 | Stewart |
| 5,410,711 A | 4/1995 | Stewart |
| 5,410,713 A | 4/1995 | White et al. |
| 5,418,969 A | 5/1995 | Matsuzaki et al. |
| 5,428,790 A | 6/1995 | Harper et al. |
| 5,432,946 A | 7/1995 | Allard et al. |
| 5,442,757 A * | 8/1995 | McFarland et al. ......... 712/218 |
| 5,452,401 A | 9/1995 | Lin |
| 5,457,790 A | 10/1995 | Iwamura et al. |
| 5,457,801 A | 10/1995 | Aihara |
| 5,461,266 A | 10/1995 | Koreeda et al. |
| 5,475,848 A | 12/1995 | Ikeda |
| 5,481,731 A | 1/1996 | Conary et al. |
| 5,487,181 A | 1/1996 | Dailey et al. |
| 5,528,790 A | 6/1996 | Curran |
| 5,546,591 A | 8/1996 | Wurzburg et al. |
| 5,548,765 A | 8/1996 | Tsunoda et al. |
| 5,560,017 A | 9/1996 | Barrett et al. |
| 5,560,020 A | 9/1996 | Nakatani et al. |
| 5,560,024 A | 9/1996 | Harper et al. |
| 5,625,826 A | 4/1997 | Atkinson |
| 5,630,107 A | 5/1997 | Carmean et al. |
| 5,630,143 A | 5/1997 | Maher et al. |
| 5,630,146 A | 5/1997 | Conary et al. |
| 5,632,037 A | 5/1997 | Maher et al. |
| 5,637,932 A | 6/1997 | Koreeda et al. |
| 5,657,483 A | 8/1997 | Kardach et al. |
| 5,842,029 A | 11/1998 | Conary et al. |
| 5,935,253 A | 8/1999 | Conary et al. |
| 6,006,336 A | 12/1999 | Watts, Jr. et al. |
| 6,029,249 A | 2/2000 | Atkinson |
| 6,088,807 A | 7/2000 | Maher et al. |
| 6,173,409 B1 | 1/2001 | Watts, Jr. et al. |
| 6,223,293 B1 | 4/2001 | Foster et al. |
| 6,233,691 B1 | 5/2001 | Atkinson |
| 6,243,820 B1 | 6/2001 | Rosch |
| 6,311,287 B1 | 10/2001 | Dischler et al. |
| 6,343,363 B1 | 1/2002 | Maher et al. |
| 6,397,340 B2 | 5/2002 | Watts, Jr. et al. |
| 2001/0001880 A1 | 5/2001 | Watts, Jr. |

FOREIGN PATENT DOCUMENTS

| | | |
|---|---|---|
| EP | 0229692 | 7/1987 |
| EP | 0349726 | 5/1989 |
| EP | 0363567 | 6/1989 |
| EP | 0358423 | 9/1989 |
| EP | 0425410 A2 | 10/1989 |
| EP | 0385567 | 1/1990 |
| EP | 0368144 | 5/1990 |
| EP | 0451661 A2 | 3/1991 |
| GB | 2010551 | 12/1977 |
| GB | 2130765 | 11/1982 |
| GB | 2127999 | 4/1986 |
| JP | SHO 551980-47549 | 9/1978 |
| JP | HEI311991-116210 | 10/1981 |
| JP | SHO581983-205226 | 5/1982 |
| JP | 58182736 | 10/1983 |
| JP | SHO591984-167752 | 10/1983 |
| WO | WO 92/10032 | 11/1990 |
| WO | WO 92/21081 | 11/1992 |

* cited by examiner

US 6,910,141 B2

PIPELINED DATA PROCESSOR WITH SIGNAL-INITIATED POWER MANAGEMENT CONTROL

RELATED APPLICATIONS

This is a division of U.S. patent application Ser. No. 10/216,615, filed Aug. 9, 2002 now U.S. Pat. No. 6,721,894.

TECHNICAL FIELD OF THE INVENTION

This invention relates in general to integrated circuits, and more particularly to a pipelined data processor with power management control.

BACKGROUND OF THE INVENTION

Increasingly, electronic circuit manufacturers need to reduce the power consumption of their boards. The conservation of power is particularly important in portable electronic devices, such as laptop or notebook computers, where the product is specifically designed for use in situations where power outlets are not available. Since laptop and notebook computers must operate using internal batteries or rechargeable battery packs for extended periods of time, the conservation of battery power becomes a primary concern.

In a laptop or notebook computer, the largest consumer of power is the display. The proportion of power consumed by the display will vary depending on the technology used. Thus, laptop and notebook computer manufacturers have disabled the power to the display during periods of inactivity. Decoupling the display from the power supply can be accomplished with fairly simple circuitry.

The next largest consumer of power on a laptop or notebook computer is the CPU motherboard microprocessor. Heretofore, computer manufacturers have used one or two techniques for reducing power consumption of the microprocessor during periods of inactivity. One technique reduces the speed of the system clock to a fraction of the normal operating frequency during periods of inactivity. Since the power consumption of the microprocessor is proportional to the frequency, reducing the frequency of the system clock also reduces the power consumption of the microprocessor. In an Intel 80386DX microprocessor (manufactured by Intel Corporation of Santa Clara, Calif.), reducing the operating frequency from 33 MHz to 4 MHz reduces the typical operating current of the microprocessor from 400 to approximately 100 milliamps. Nevertheless, an operating current of 100 milliamps still poses a large power drain on the battery.

A second technique for reducing power turns off the system clock during periods of inactivity. Turning off the system clock affects all circuitry on the motherboard. Consequently, the circuitry which disables the system clock must also save all pertinent information in the microprocessor and associated board logic and restore the data upon resumption of activity such that the state of the computer after resumption of the system clock will be identical to the state of the computer prior to disabling the system clock. As a result, this technique for consuming power is both costly because of the complicated circuitry and slow because of the need to store and restore the state of the computer.

Therefore, a need has arisen in the industry to provide a method and apparatus for conserving power in an electronic device which significantly reduces the power drain of the microprocessor without the need for complicated external circuitry.

SUMMARY OF THE INVENTION

In accordance with the presently claimed invention, a pipeline data processor with signal-initiated power management control is provided in which a plurality of subcircuits, including pipeline subcircuitry, and circuitry for generating and controlling at least one clock signal are responsive to at least one control signal by selectively disabling a clock signal to the pipeline subcircuitry.

In accordance with one embodiment of the presently claimed invention an apparatus including integrated processor circuitry includes a plurality f interface electrodes, control circuitry, clock circuitry and a plurality of subcircuits. The plurality type of interface electrodes includes one or more control electrode to convey one or more incoming control signals from at least one signal source having at least a first combination of respective assertion and de-assertion states corresponding to a power management operation mode. The control circuitry is coupled to the one or more control electrodes and responsive to the one or more incoming control signals by providing at least one clock control signal having respective assertion and de-assertion states related to the one or more incoming control signal ass on and de-assertion states with the respective assertion states following the first coming control signal states combination. The clock circuitry is coupled to the control circuitry and responsive to the at least one clock control signal by providing at least a first clock signal having active and inactive states corresponding to the at least one clock control signal de-assertion and assertion states, respectively. The plurality of subcircuits is coupled to at least a portion of the plurality of interface electrodes, the control circuitry and the clock circuitry, and includes pipeline subcircuitry responsive to the first clock signal by selectively operating on one or more instructions for data processing. A first portion of the pipeline subcircuitry is responsive to the active first clock signal by performing at least one or more respective portions of one or more decoding operations upon each one of at least one or more respective portions of one or more incoming instructions to provide one or more decoded instructions second portion of the pipeline subcircuitry is coupled to the first pipeline e subcircuitry portion and responsive to the active first clock signal by executing the one or more decoded instructions.

In accordance with another embodiment of the presently claimed invention, an apparatus including integrated processor circuitry includes interface in means, controller means, clock source means and subcircuit means. The interface mean is for conveying one or more incoming control signals from at least one signal source having at least a first combination of respective assertion and de-assertion states corresponding to a power management operation mode. The controller means is for responding to the one or more incoming control signals by generating at least one clock control signal having respective assertion and de-assertion states related to the one or more incoming control signal assertion and de-assertion states with the respective assertion states following the first incoming control signal states combination. The clock source means is for responding to the at least one clock control signal by generating at least a first clock signal having active and inactive states corresponding to the at least one clock control signal de-assertion and assertion states, respectively. The subcircuit means includes pipeline means for to the first clock signal by selectively operating on one or more instructions for data processing. A first portion of the pipeline means is for responding to the active first clock signal by performing at least one or more respective portions of one or more decoding operations upon each one of at least one or more respective portions of one or more incoming instructions to provide one or more decoded instructions, and a second portion of the pipeline means is for responding to the active first clock signal by executing the one or more decoded instructions.

In accordance with another embodiment of the presently claimed invention, an apparatus including integrated processor circuitry includes a plurality of interface electrodes, control circuitry, clock circuitry and a plurality of subcircuits. The plurality of interface electrodes includes one or more control electrode to convey one or more incoming control signals from at least one signal source having at least a first combination of respective assertion and de-assertion states corresponding to a power management operation mode. The control circuitry is coupled to the one or more control electrodes and responsive to the one or more incoming control signals by providing at least one clock control signal having respective assertion and de-assertion states related to the one or more incoming control signal assertion and de-assertion states. The clock circuitry is coupled to the control circuitry and responsive to the at least one clock control signal by providing at least a first clock signal having active and inactive states corresponding to the at least one clock control signal de-assertion and assertion states, respectively, with the inactive state following the first incoming control signal states combination. The plurality of subcircuits is coupled to at least a portion of the plurality of interface electrodes, the control circuitry and the clock circuitry, and includes pipeline subcircuitry responsive to the first clock signal by selectively operating on one or more instructions for data processing. A first portion of the pipeline subcircuitry is responsive to the active first clock signal by performing at least one or more respective portions of one or more decoding operations upon each one of at least one or more respective portions of one or more incoming instructions to provide one or more decoded instructions, an a second portion of the pipeline subcircuitry is coupled to the first pipeline subcircuitry portion and responsive to the active first clock signal by executing the one or more decoded instructions.

In accordance with another embodiment of the presently claimed invention, an apparatus including integrated processor circuitry includes interface means, controller means, clock source means and subcircuit means. The interface means is for conveying one or more incoming control signals from at least one signal source having at least a first combination of respective assertion and de-assertion states corresponding to a power management operation mode. The controller means is for responding to the one or more incoming control signals by generating at least one clock control signal having respective assertion and de-assertion states related to the one or more incoming control signal assertion and de-assertion states. The clock source means is for responding to the at least one clock control signal by generating at least a first clock signal having active and inactive states corresponding to the at least one clock control signal de-assertion and assertion states, respectively, with the inactive state following the first incoming control signal states combination. The subcircuit means includes pipeline means for responding to the first clock signal by selectively operating on one or more instructions for data processing. A first portion of the pipeline means is for responding to the active first clock signal by performing at least one or more respective portions of one or more decoding operations upon each one of at least one or more respective portions of one or more incoming instructions to provide one or more decoded instructions, and a second portion of the pipeline means is for responding to the active first clock signal by executing the one or more decoded instructions.

In accordance with another embodiment of the presently claimed invention, an apparatus including integrated processor circuitry includes a plurality of interface electrodes, control circuitry, clock circuitry and a plurality of subcircuits. The plurality of interface electrodes includes one or more control electrode to convey one or more incoming control signals from at least one signal source having at least a first combination of respective assertion and de-assertion states corresponding to a power management operation mode. The control circuitry is coupled to the one or more control electrodes and responsive to the one or more incoming control signals by providing at least one clock control signal having respective assertion and de-assertion states related to the one or more incoming control signal assertion and de-assertion states with the respective assertion states following the first coming control signal states combination. The clock circuitry is coupled to the control circuitry and responsive to the at least one clock control signal by providing at least a first clock signal having an active state having a plurality of successive cycles and an inactive state having substantially zero cycles corresponding to the at least one clock control signal de-assertion and assertion states, respectively. The plurality of subcircuits is coupled to at least a portion of the plurality of interface electrodes, the control circuitry and the clock circuitry, and includes pipeline subcircuitry responsive to the first clock signal by selectively operating on one or more instructions for data processing. A first portion of the pipeline subcircuitry is responsive to at least a first one of the plurality of first clock signal cycles by performing at least one or more respective portions of one or more decoding operations upon each one of at least one or more respective portions of one or more incoming instructions to provide one or more decoded instructions, and a second portion of the pipeline subcircuitry is coupled to the first pipeline subcircuitry portion and responsive to at least a second one subsequent to the first one of the plurality of first clock signal cycles by executing the one or more decoded instructions.

In accordance with another embodiment of the presently claimed invention, an apparatus including integrated processor circuitry includes interface means, controller means, clock source means and subcircuit means. The interface mean is for conveying one or more incoming control signals from at least one signal source having at least a first combination of respective assertion and de-assertion states corresponding to a power management operation mode. The controller means is for responding to the one or more incoming control signals by generating at least one clock control signal having respective assertion and de-assertion state related to the one or more incoming control signal assertion and de-assertion states with the respective assertion states following the first incoming control signal states combination. The clock source means is for responding to the at least one clock control signal by generating at least a first clock signal having an active state having a plurality of successive cycles and an inactive state having substantial zero cycles corresponding to the at least one clock control signal de-assertion and assertion states, respectively. The subcircuit means includes pipeline means for responding to the first clock signal by selectively operating on one or more instructions for data processing. A first portion of the pipeline means is for responding to at least a first one of the plurality of first clock signal cycles by performing at least one or more respective portions of one or more decoding operations upon each one of at least one or more respective portions of one or more incoming instructions to provide one or more decoded instructions, and a second portion of the pipeline means is for responding to at least a second one subsequent to the first one of the plurality of firs clock signal cycles by executing the one or more decoded instructions.

In accordance with another embodiment of the presently claimed invention, an apparatus including integrated processor circuitry includes a plurality of interface electrodes, control circuitry, clock circuitry and a plurality of subcircuits. The plurality of interface electrodes includes one or more control electrode to convey one or more incoming control signals from at least one signal source having at least a first combination of respective assertion and de-assertion states corresponding to a power management operation mode. The control circuit is coupled to the one or more control electrodes and responsive to the one or more incoming control signals by providing at least one clock control signal having respective assertion and de-assertion states related to the one or more incoming control signal assertion and de-assertion states. The clock circuitry is coupled to the control circuitry and responsive to the at least one clock control signal by providing at least a first clock signal with an active state having a plurality of successive cycles and an inactive state having substantially zero cycles corresponding to the at least one clock control signal de-assertion and assertion states, respectively, with the inactive state following the first incoming control signal states combination. The plurality of subcircuits coupled to at least a portion of the plurality of interface electrodes, the control circuitry and the clock circuitry, and includes pipeline subcircuitry responsive to the first clock signal by selectively operating on one or more instructions for data processing. A first portion of the pipeline subcircuitry is responsive to at least a first one of the plurality of first clock signal cycles by performing at least one or more respective portions of one or more decoding operations upon each one of at least one or more respective portions of one or more incoming instructions to provide one or more decoded instructions, and a second portion of the pipeline subcircuitry is coupled to the first pipeline subcircuitry portion and responsive to at least a second one subsequent to the first one of the plurality of first clock signal cycles by executing the one or more decoded instructions.

In accordance with another embodiment of the presently claimed invention, an apparatus including integrated processor circuitry includes interface means, controller means, clock source means and subcircuit means. The interface means is for conveying one or more incoming control signals from at least one signal source having at least a first combination of respective assertion and de-assertion states corresponding to a power management operation mode. The controller means is for responding to the one or more incoming control signals by generating at least one clock control signal having respective assertion and de-assertion states related to the one or more incoming control signal assertion and de-assertion states. The clock source means is for responding to the at least one clock control signal by generating at least a first clock signal with an active state having a plurality of successive cycles and an inactive state having substantially zero cycles corresponding to the at least one clock control signal de-assertion and assertion states, respectively, with the inactive state following the first incoming control signal states combination. The subcircuit means includes pipeline means for responding to the first clock signal by selectively operating on one or more instructions for data processing. A first portion of the pipeline means is for responding to at least a first one of the plurality of first clock signal cycles by performing at least one or more respective portions of one or more decoding operations upon each one of at least one or more respective portions of one or more incoming instructions to provide one or more decoded instructions and a second portion of the pipeline means is for responding to at least a second one subsequent to the first one of the plurality of first clock signal cycles by executing the one or more decoded instructions.

In accordance with another embodiment of the presently claim invention an apparatus including integrated processor circuitry includes a plurality of interface electrodes, control circuitry, clock circuitry and a plurality of subcircuits. The plurality of interface electrodes includes one or more control electrode to convey one or more incoming control signals from at least one signal source having at least a first combination of respective assertion and de-assertion states corresponding to a power management operation mode. The control circuitry is coupled to the one or more control electrodes and responsive to the one or more incoming control signals and a first clock signal by providing at least one clock control signal having respective assertion and de-assertion states related to the one or more incoming control signal assertion and de-assertion states with the respective assertion states following the first incoming control signal states combination. The clock circuitry is coupled to the control circuitry and responsive to the at least one clock control signal by providing the first clock signal having active and inactive states substantially independent of the at least one clock control signal assertion and de-assertion states, and second clock signal having active and inactive states corresponding to the at least one clock control signal de-assertion and assertion states, respectively. The plurality of subcircuits is coupled to at least a portion of the plurality of interface electrodes, the control circuitry and the clock circuitry, and includes pipeline subcircuitry responsive to the active second clock signal by executing one or more instructions for data processing.

In accordance with another embodiment of the presently claimed invention an apparatus including integrated processor circuitry includes interface means, controller means, clock source means and subcircuit means. The interface means is for conveying one or more incoming control signals from at least one signal source having at least a first combination of respective assertion and de-assertion states corresponding to a power management operation mode. The controller means is for responding to the one or more incoming control signals and a first clock signal by generating at least one clock control signal having respective assertion and de-assertion states related to the one or more incoming control signal assertion and de-assertion states with the respective assertion states following the first incoming control signal states combination. The clock source means is for responding to the at least one clock control signal by generating the first clock signal having active and inactive states substantially independent of the at least one clock control signal assertion and de-assertion states, and a second clock signal having active and inactive states corresponding to the at least one clock control signal de-assertion and assertion states, respectively. The subcircuit means includes pipeline means for responding to the active second clock signal by executing one or more instructions for data processing.

In accordance with another embodiment of the presently claimed invention, an apparatus including integrated processor circuitry includes a plurality of interface electrodes, control circuitry, clock circuitry and a plurality of subcircuits. The plurality of interface electrodes includes one or more control electrode to convey one or more incoming control signals from at least one signal source having at least a first combination of respective assertion and de-assertion states corresponding to a power management operation mode. The control circuitry is coupled to the one or more control electrodes and responsive to the one or more incoming control signals and a first clock signal by providing at least one clock control signal having respective assertion and de-assertion states related to the one or more incoming control signal assertion and de-assertion states. The clock circuitry is coupled to the control circuitry and responsive to the at least one clock control signal by providing the first clock signal having active and inactive states substantially independent of the at least one clock control signal assertion and de-assertion states, and a second clock signal having active and inactive states corresponding to the at least one clock control signal de-assertion and assertion states, respectively, with the second clock signal inactive state following the first incoming control signal states combination. The plurality of subcircuits is coupled to at least a portion of the plurality of interface electrodes, the control circuitry and the clock circuitry, and includes pipeline subcircuitry responsive to the active second clock signal by executing one or more instruction, for data processing.

In accordance with another embodiment of the presently claimed invention, an apparatus including integrated processor circuitry includes interface means, controller means, clock source means and subcircuit means. The interface means is for conveying one or more incoming control signals from at least one signal source having at least a first combination of respective assertion and de-assertion states corresponding to a power management operation mode. The controller means is for responding to the one or more incoming control signals and a first clock signal by providing at least one clock control signal having respective assertion and de-assertion states related to the one or more incoming control signal assertion and de-assertion states. The clock source means is for responding to the at least one clock control signal by generating the first clock signal having active and inactive states substantially independent of the at least one clock control signal assertion and de-assertion states, and a second clock signal having active and inactive states corresponding to the at least one clock control signal de-assertion and assertion states, respectively, with the second clock signal inactive state following the first incoming control signal states combination. The subcircuit means includes pipeline means for responding to the active second clock signal by executing one or more instructions for data processing.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The preferred embodiment of the present invention and its advantages are best understood by referring to FIGS. 1–6 of the drawings, like numerals being used for like and corresponding parts of the various drawings.

Figure 1:
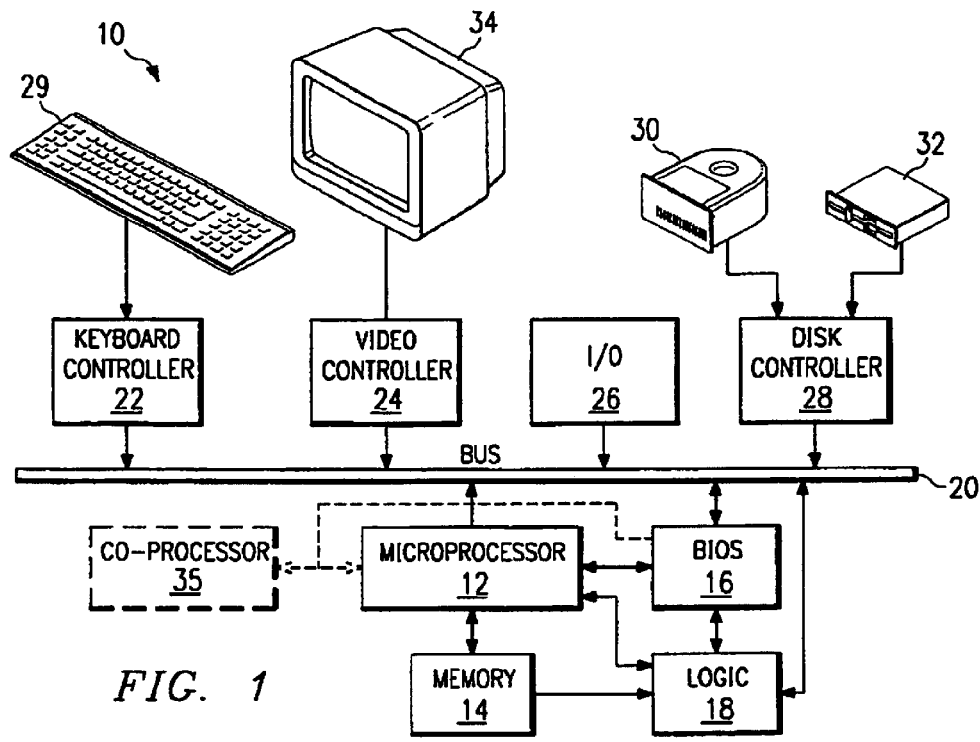
FIG. 1 illustrates a block diagram of a computer system.

FIG. 1 illustrates a block diagram of a computer system. The computer system 10 comprises a microprocessor 12 coupled to a memory subsystem 14, BIOS e ROM 16 and logic 18 (commonly referred to as the "chipset"). Microprocessor 12 is coupled to bus 20. Bus 20 is used to communicate with a number of devices, shown in FIG. 1 as keyboard controller 22 video controller 24, I/O circuitry 26 and disk controller 28. Keyboard controller 22 is coupled to keyboard 29. Disk controller 28 is coupled to hard disk 30 and floppy disk 32. Video controller 24 is coupled to display 34. An optional coprocessor 35 is coupled to microprocessor 12 and BIOS 16.

The computer system 10 shown in FIG. 1 is a general-purpose architecture common to personal computers such as the IBM Personal Computer and compatibles. The BIOS 16 (basic input/output system) is typically a read-only memory which contains a set of programs for performing the basic control and supervision operations for the computer system 10. The BIOS 16 acts as an interface between the computer circuitry and the application software being executed by the CPU 12. Importantly, for power consumption purposes, the BIOS 16 and logic 18 monitor the circuitry to determine whether power consumption reduction procedures may be invoked. For example, the BIOS 16 and/or logic 18 may monitor the display 34 to determine whether its output has changed over a predetermined time period. If not, the BIOS 16 may invoke procedures to disable power to the display 34 (assuming computer system 10 is a portable computer) to conserve energy. Further, BIOS 16 monitors microprocessor 12 to determine whether the microprocessor can be idled without affecting operation of the computer system 10. For example, the microprocessor 12 may be executing a routine to wait for a character from the keyboard. In this case, the operation of the microprocessor can be suspended until a key is pressed.

Figure 2:
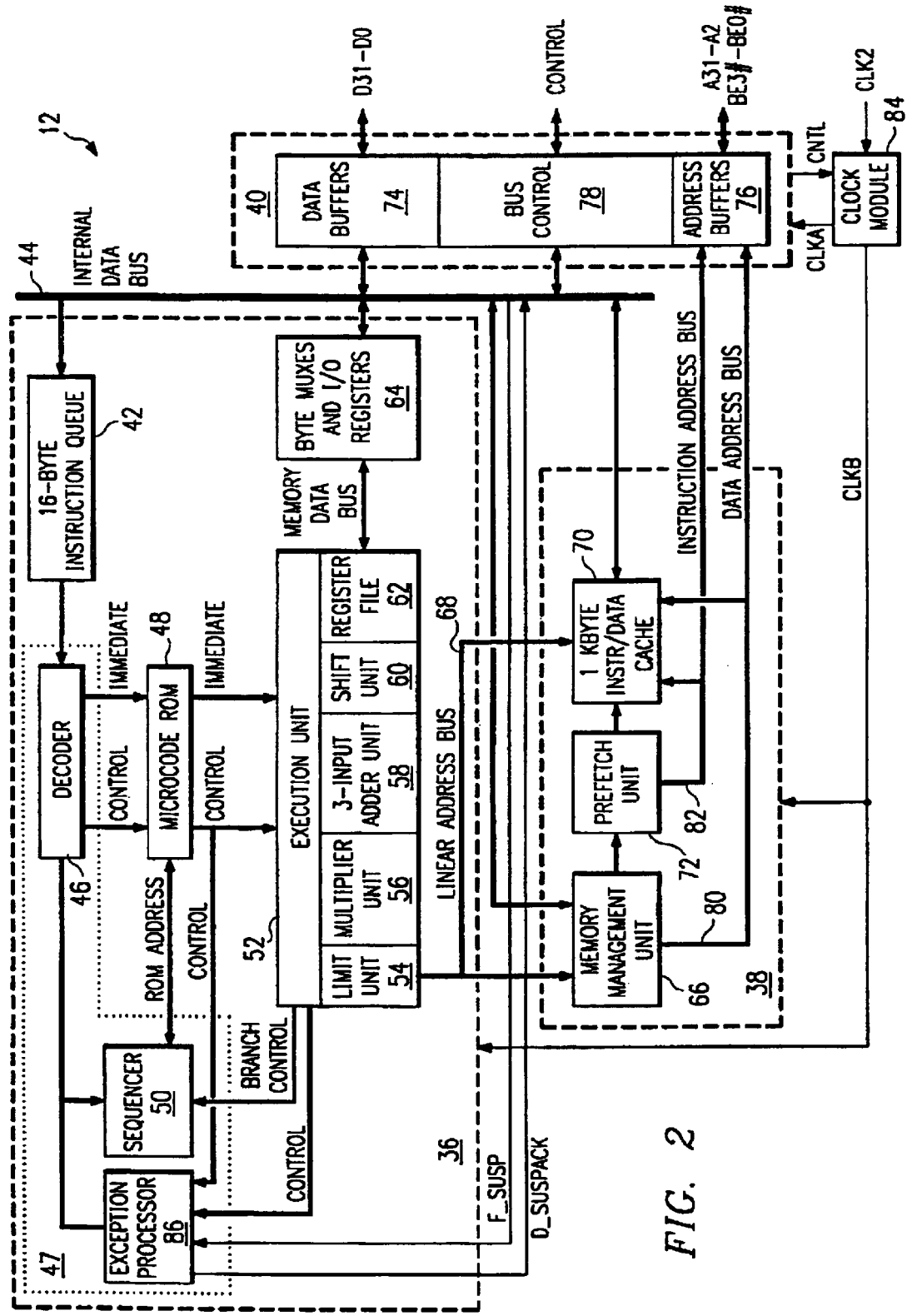
FIG. 2 illustrates a block diagram of the preferred embodiment of a microprocessor used in the computer system of FIG. 1.

FIG. 2 illustrates a detailed block diagram of the various subcircuits of a preferred embodiment of the microprocessor 12. For purposes of illustration, the microprocessor 12 will be described in connection with a microprocessor which is pin-compatible and instruction-compatible with the 80×86 family of processors by Intel Corporation, specifically the 80386 microprocessor although the invention could be used in other processors as well. The microprocessor 12 comprises three main functional groups: the core circuitry 36, the memory circuitry 38 and the bus controller 40. The core circuitry 36 includes an instruction queue 42 coupled to an internal data bus 44. The output of the instruction queue 42 is coupled to a decoder 46 of the decode/sequence circuitry 47. The decode/sequence circuitry 47 also includes a sequencer 50 and an exception processor 86. The decoder 46 is coupled to a microcode ROM 48, exception processor 86 and sequencer 50. The sequencer 50 is also coupled to the microcode ROM 48 and to an execution unit 52. The execution unit includes a limit unit 54, a multiplier unit 56, an adder unit 58, a shift unit 60, and a register file 62. The execution unit 52 is coupled to the microcode ROM 48 and to multiplexer and I/O register circuitry 64. The memory circuitry 38 comprises a memory management unit 66 coupled to a linear address bus 68 which is also connected to the execution unit 52 and an instruction/data cache memory 70. Memory management unit 66 is further coupled to the internal data bus 44. A prefetch unit 72 is coupled between the memory management unit 66 and the cache 70. Bus controller 40 includes data buffers 74, address buffers 76 and control circuitry 78. The data buffers 74 are coupled to the data I/O pins D31–D0, the address buffers 76 are coupled to the address pins A31–A2 and BE3#–BE0#. A data address bus 80 couples the memory management unit 66, the cache 70 and the address buffer 76. An instruction address bus 82 couples the prefetch unit 72, cache 70 and address buffer 76. The data buffers 74 are coupled to the internal data bus 44.

Clock module 84 receives an external clock signal (CLK2) and generates CLKA (connected to the bus controller 40) and CLKB (coupled to the memory circuitry 38 and the core circuitry 36). CLKA and CLKB are both clock signals of one-half the frequency of CLK2. Clock module 84 receives control signals from bus controller 40.

In operation, instructions are received by the microprocessor 12 from external memory under control of the memory management unit 66. For enhanced performance, an instruction/data cache 70 caches instruction and data received through the bus controller 40. Instructions are stored in the instruction queue and are subsequently translated by the decode circuitry 46 into microcode. The sequencer points to the next address in the microcode ROM 48 under control of the decoder 46 and the execution unit 52. The execution unit 52 processes information under control of the microcode ROM 48.

In the preferred embodiment, the microprocessor 12 has a static design, i.e., retention of data in the internal memories and registers of the microprocessor 12 is not dependent upon the clock signal. As described in greater detail hereinbelow, the clock module 84, under control of the bus controller 40, can disable clocks to the subcircuits of the core circuitry 36 and the memory circuitry 38 while continuing to generate clock signals to the bus controller 40. Thus, during periods of inactivity, a large portion of the circuitry of the microprocessor may be suspended, thereby greatly reducing the power consumed by the microprocessor 12.

Figure 3:
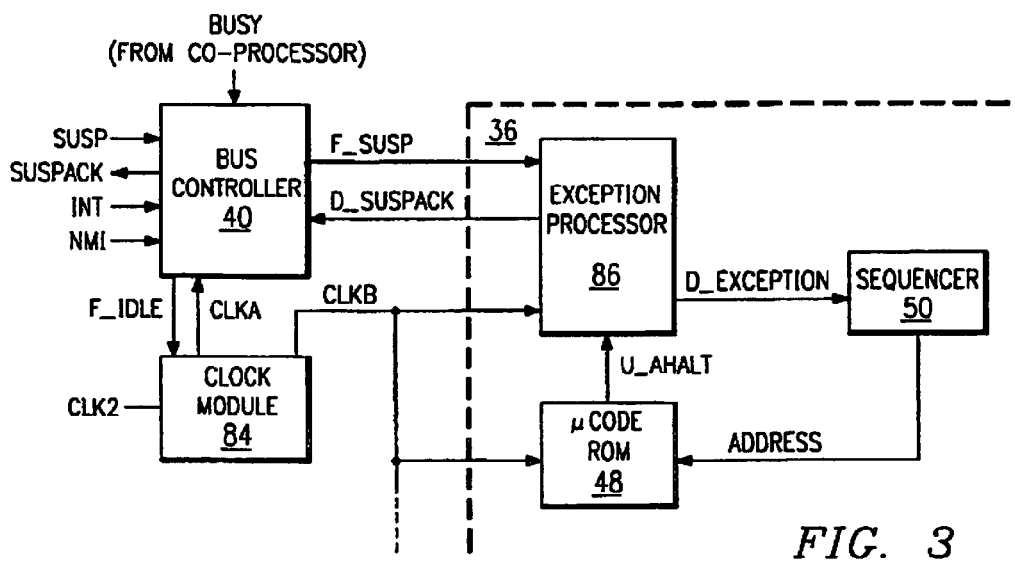
FIG. 3 illustrates a detailed block diagram of portions of the microprocessor of FIG. 2 related to the power management circuitry.
Figure 4:
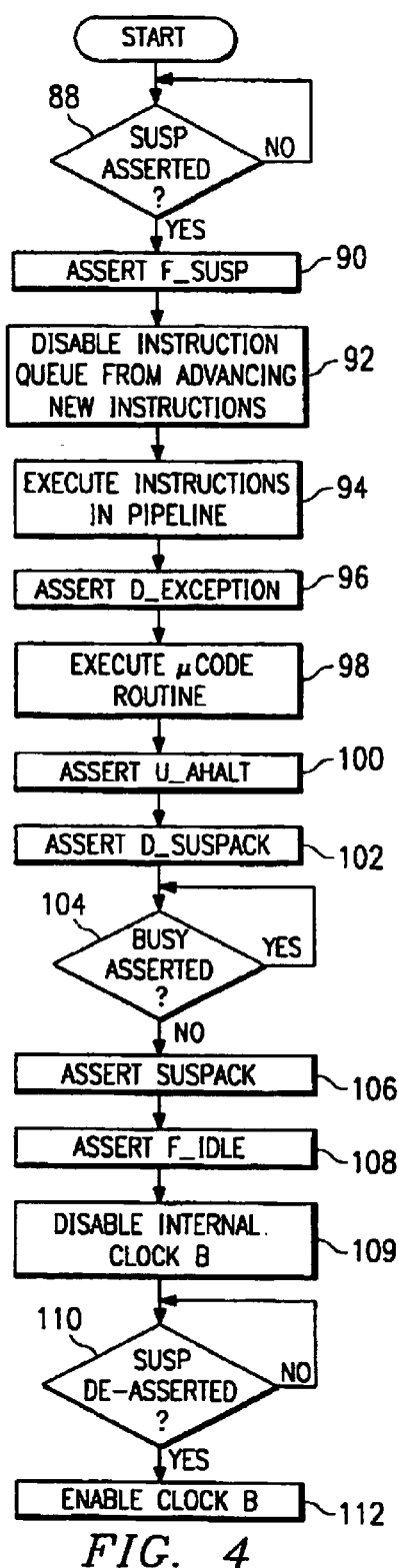
FIG. 4 illustrates a flow chart describing a preferred embodiment of operation for reducing microprocessor power consumption.

FIGS. 3 and 4 describe the power reduction circuitry in greater detail. FIG. 3 is a block diagram showing control signals between various portions of the microprocessor. The bus controller 40 controls signals from external pins of the microprocessor 12. A suspend (SUSP) signal is input to the bus controller 40 and a suspend acknowledge (SUSPACK) is output from the bus controller 40. A busy (BUSY) is received by the bus controller 40 from the coprocessor 35. The bus controller 40 also receives a maskable interrupt (INTR) and a non-maskable interrupt (NMI). The bus controller 40 outputs an interrupt (or "exception") F_SUSP to the exception processor 86 and receives a control signal D_SUSPACK. The exception processor 86 also monitors the microcode ROM 48, bus controller 40 and execution unit 52 to determine whether instructions are being executed. The exception processor 86 outputs a signal D_EXCEPTION to the sequencer 50 and receives a control signal U_AHALT from the microcode ROM 48. The bus controller 40 outputs a control signal F_IDLE to the clock module 84.

In operation, an external circuit (typically the BIOS 16 in conjunction with the logic 18) detects conditions where microprocessor operations could be suspended. Upon detection of such a situation, the external circuit asserts the SUSP pin (for example, by driving the SUSP pin with a logical low voltage). In response to the assertion of the SUSP signal, the bus controller 40, in conjunction with the exception processor 86, asserts the F_IDLE control signal to the clock module 84. In response to the assertion of the F_IDLE signal, the clock module 84 disables the CLKB clock signals (by holding the disabled clock signal at a logical high or logical low voltage), while continuing to generating the CLKA clock signals. Since the design of the microprocessor is static, the memories do not require refreshing, and therefore suspending the clock will not result in a loss of data within the microprocessor 12. The SUSPACK signal is asserted to notify external circuitry that the microprocessor 12 is in the suspended state. To resume operation of the microprocessor 12, the e SUSP signal is de-asserted (i.e., by applying a logical low voltage to the SUSP pin).

By suspending the clocks to the core circuitry 36 and memory circuitry 38, a significant reduction in the power consumed by the microprocessor 12 is realized. The bus controller 40 remains active to observe and control I/O signals between the microprocessor 12 and the external circuitry.

FIG. 4 illustrates a flow chart showing a more detailed operation of the suspend mode. In decision block 88, a loop is formed waiting for the SUSP signal to be asserted. In block 90, after the SUSP signal is asserted, the bus controller 40 asserts the F_SUSP signal, which is coupled to the exception processor 86. In block 92, in response to the assertion of the F SUSP signal, the instruction queue 42 is prevented from advancing new instructions. In block 94, the decoder 46 ceases to advance new instructions to the microcode ROM 48 and any instructions currently being processed by the microcode ROM 48 or execution unit 52 (collectively, the "pipeline") are completed, including any activity by the bus controller 40 related to the instructions in the pipeline. After all instructions in the pipeline have been executed, the control signal D_EXCEPTION is asserted by the exception processor 86 in block 96. D_EXCEPTION is received by the sequencer 50 which initiates a power-down microcode routine (block 98) responsive to D_EXCEPTION. The power-down microcode routine prepares the microprocessor for suspend mode. In block 100, the microcode ROM 48 asserts the control signal U_AHALT to the exception processor 86. In response to receiving U_AHALT, the exception processor 86 asserts D_SUSPACK to the bus controller 40 in block 102. In decision 104, the bus controller 40, after receiving D_SUSPACK from the exception processor, checks the busy signal received from the coprocessor. So long as the busy signal from the coprocessor is asserted, the SUSPACK signal to the external circuitry will not be asserted and CLKB will not be disabled. Once, the busy signal is de-asserted by the coprocessor, the SUSPACK signal is asserted by the bus controller 40 to alert the external circuitry that the microprocessor 12 is in a suspended state and that the coprocessor is not currently performing any calculations, and may also be suspended. In block 108, F_IDLE is asserted by the bus controller 40 to the clock module 84. In response to the assertion of the F_IDLE signal, the clock module 84 disables the CLKB in block 109, thereby suspending operation of the core circuitry 36 and memory circuitry 38. The bus controller 40 then waits until the SUSP signal is de-asserted in decision block 110. Upon de-assertion of the SUSP signal, CLKB is resumed.

Most microprocessors, including the 80386, do not use all available pins on the chip package. Thus, the SUSP and SUSPACK signals may be communicated to and from the microprocessor 12 using unused pins, thereby maintaining compatibility with a pre-existing technology. Nonetheless, in the preferred embodiment, the pins for the SUSP and SUSPACK signals may be selectively enabled or disabled. In the preferred embodiment, the SUSP and SUSPACK pins are initially disabled, and the BIOS 16 must be configured to enable the pins in its start-up routine. To effect enabling or disabling of the SUSP and SUSPACK pins, a control bit is provided which may be written to or read from via preselected I/O ports. The preferred embodiment of this aspect is shown in greater detail in connection with FIGS. 5a–b.

Figure 5A:
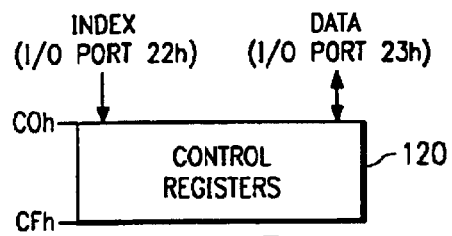
FIGS. 5a–b illustrate circuitry for enabling and disabling pins providing power management control signals.

In FIG. 5a, a plurality of control registers are accessible using INDEX and DATA signals input to the control registers 120. The majority of the registers (and bits thereof) are used for configuring the cache memory subsystem. For example, the control registers may be used to define non-cacheable regions of the main memory 14, to select the cache method (direct-mapped or set associative), and to enable flushing of the cache memory 70 via an external pin. Each control register is accessible by writing the address (referred to herein as the INDEX) of the register to an I/O port, shown in FIG. 5a as I/O port 22h. Another I/O port, shown herein as I/O port 23h, is used to read or write data from the specified control register. In the preferred embodiment, each I/O port 23h operation is preceded by an I/O port 22h operation, otherwise the second and later I/O port 23h operation would be directed off-chip. In the illustrated embodiment of FIG. 5a, the control registers each have an index between C0h and CFh.

Figure 5B:
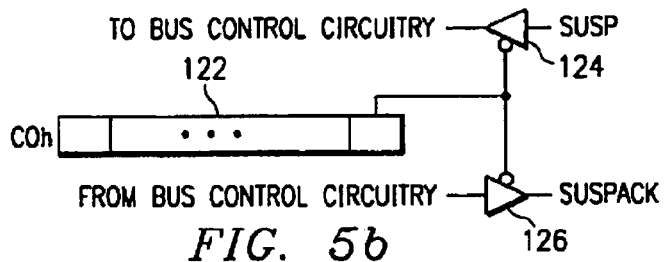

In FIG. 5b, the register having an index of C0h uses its least significant bit to control tri-state devices 124 and 126. A bit equal to a logical high (i.e., a logical "1") enables both tri-state devices 124 and 126 to provide transmission of the SUSP and SUSPACK signals. A logical "0" disables the SUSP and SUSPACK pins from the circuitry of the microprocessor 12.

This aspect of the preferred embodiment ensures pin-compatibility with an existing pin structure.

Figure 6:
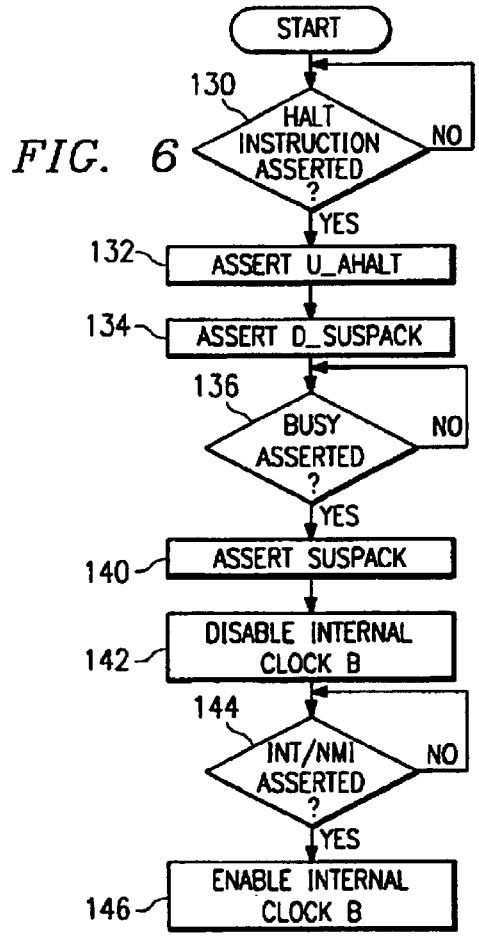
FIG. 6 illustrates a flow chart of the operation of software controlled embodiment for conserving microprocessor power consumption.

FIG. 6 illustrates another aspect of the present invention wherein the operation of the microprocessor 12 may be suspended responsive to a software command. 80×86 devices support a "HALT" operation (Opcode F4) which stops execution of all instructions and places the 80×86 in a HALT state. Execution is resumed responsive to a non-maskable interrupt (on the NMI pin) coupled to the bus controller 40, an unmasked interrupt (on the INTR pin coupled to the bus controller 40) or a RESET. Normally, this instruction is used as the last instruction in a sequence which shuts down the system.

In the present invention, however, the HALT instruction has essentially the same consequence as asserting the SUSP pin. Thus, the BIOS 16 can issue a HALT instruction to the microprocessor 12, thereby disabling CLKB. Again, disabling CLKB will result in a significant reduction of power consumed by the microprocessor 12.

FIG. 6 illustrates a flow chart showing the operation of the HALT instruction in the preferred embodiment. Once a HALT instruction to the microprocessor 12 is received in decision block 130, U_AHALT is asserted by the microcode ROM 48 in block 132. In response to the U_AHALT signal from the microcode ROM, the exception processor 86 asserts D_SUSPACK. After checking the busy signal from the coprocessor in decision block 136, the SUSPACK signal is asserted in block 140 by the bus controller 40 and the internal CLKB clock is disabled in block 142. In decision block 144, the microprocessor 12 remains in the suspended state until an interrupt is asserted in decision block 144. Once the interrupt is asserted, the CLKB clock is enabled and processing continues.

The HALT instruction allows the BIOS 16 to place the microprocessor 12 in a suspended state without any additional hardware connections to the microprocessor.

The present invention provides significant advantages over the prior art. By suspending the clocks to the core circuitry and memory circuitry, a current consumption of less than 10 milliamps has been demonstrated. Since most BIOS programs support power conservation measures, the additional coding for supporting the SUSP and SUSPACK signals is relatively simple. Alternatively, the chipset logic 18 can be modified to support the SUSP and SUSPACK signals. Further, since the SUSPACK, in the preferred embodiment, is not asserted until after coprocessor operations are completed, the BIOS does not have to provide additional circuitry or codes for monitoring the coprocessor. Further, the power saving circuitry may be provided on the microprocessor chip without sacrificing pin-compatibility. Additionally, by using the enhanced HALT command, the microprocessor may be operated in a suspended state without any hardware interaction, other than asserting an interrupt to bring the microprocessor 12 out of a suspended state.

Although the present invention and its advantages have been described in detail, it should be understood that various changes, substitutions and alterations can be made herein without departing from the spirit and scope of the invention as defined by the appended claims.

What is claimed is:

1. An apparatus including integrated processor circuitry, said apparatus comprising:

a plurality of interface electrodes including one or more control electrodes to convey one or more incoming control signals from at least one signal source having at least a first combination of respective assertion and de-assertion states corresponding to a power management operation mode;

control circuitry coupled to said one or more control electrodes and responsive to said one or more incoming control signals by providing at least one lock control signal having respective assertion and de-assertion states related to said one or more incoming control signal assertion and de-assertion states with said respective assertion states following said first incoming control signal states combination;

clock circuitry coupled to said control circuitry and responsive o said at least one clock control signal by providing at least a first clock signal having active and inactive states corresponding to said at least one clock control signal de-assertion and assertion states, respectively; and a plurality of subcircuits coupled to at least a portion of said plurality of interface electrodes, said control circuitry and said clock circuitry, and including pipeline subcircuitry responsive to said first clock signal by selectively operating on one or more instructions for data processing, wherein a first portion of said pipeline subcircuitry is responsive to said active first clock signal by performing at least one or more respective portion of one or more decoding operations upon each one of at least one or more respective portions of one or more incoming instructions to provide one or more decoded instructions, and a second portion of said pipeline subcircuitry is couple to said first pipeline subcircuitry portion and responsive to said active first clock signal by executing said one or more decoded instructions.

2. The apparatus of claim 1, wherein said control circuitry further provides a status signal indicative of said respective assertion states of said at least one clock control signal.

3. The apparatus of claim 1, wherein said control circuitry comprises logic circuitry that converts said one or more incoming control signals to said at least one clock control signal.

4. The apparatus of claim 1, wherein said control circuitry comprises at least one register in which said one or more incoming control signals is stored to provide said at least one clock control signal.

5. The apparatus of claim 1, wherein said clock circuitry further provides a second clock signal with active and inactive states substantially independent of said at least one clock control signal assertion and de-assertion states.

6. The apparatus of claim 1, wherein said first pipeline subcircuitry portion comprises decoding circuitry.

7. The apparatus of claim 1, wherein said second pipeline subcircuitry portion comprises arithmetic logic circuitry.

8. The apparatus of claim 1, wherein said control circuitry is responsive to a second combination of said one or more incoming control signal assertion and de-assertion states by providing said at least one clock control signal in said respective de-assertion states.

9. The apparatus of claim 1, wherein said plurality of subcircuits further includes data storage circuitry responsive to a deactivation of said first clock signal by retaining a plurality of data having respective data states determined by said execution of said one or more decoded instructions prior to said response by said control circuitry to said one or more incoming control signals.

10. The apparatus of claim 1, wherein said plurality of subcircuits further includes data storage circuitry responsive to a deactivation of said first clock signal by retaining a plurality of data having respective data states determined by said execution of said one or more decoded instructions prior to said response by said clock circuitry to said at least one clock control signal.

11. The apparatus of claim 1, wherein said plurality of subcircuits further includes data storage circuitry responsive to a deactivation of said first clock signal by retaining, until a reactivation of said first clock signal, a plurality of data having respective data states determined by said execution of said one or more decoded instructions prior to said response by said control circuitry to said one or more incoming control signals.

12. The apparatus of claim 1, wherein said plurality of subcircuits further includes data storage circuitry responsive to a deactivation of said first clock signal by retaining, until a reactivation of said first clock signal, a plurality of data having respective data states determined by said execution of said one or more decoded instructions prior to said response by said clock circuitry to said at least one clock control signal.

13. The apparatus of claim 1, wherein said plurality of subcircuits further includes data storage circuitry responsive to a reactivation following a deactivation of said first clock signal by providing a plurality of data having respective retained data states determined by said execution of said one or more decoded instructions prior to said response by said control circuitry to said one or more incoming control signals.

14. The apparatus of claim 1, wherein said plurality of subcircuits further includes data storage circuitry responsive to a reactivation following a deactivation of said first clock signal by providing a plurality of data having respective retained data states determined by said execution of said one or more decoded instructions prior to said response by said clock circuitry to said at least one clock control signal.

15. The apparatus of claim 1, wherein said control circuitry provides said at least one clock control signal in said respective assertion states following:

said first combination of said one or more incoming control signal assertion and de-assertion states; and completion of
said performance, initiated prior to said first combination of said one or more incoming control signal assertion and de-assertion states, by said first pipeline subcircuitry portion of said at least one or more respective portions of said one or more decoding operations to provide said one or more decoded instructions, and
said execution by said second pipeline subcircuitry port on of said one or more decoded instructions.

16. The apparatus of claim 15, wherein said plurality of subcircuits further includes data storage circuitry responsive to a deactivation of said first clock signal by retaining a plurality of data having respective data states determined by said execution of said one or more decoded instructions prior to said response by said control circuitry to said one or more incoming control signals.

17. The apparatus of claim 15, wherein said plurality of subcircuits further includes data storage circuitry responsive to a deactivation of said first clock signal by retaining a plurality of data having respective data states determined by said execution of said one or more decoded instructions prior to said response by said clock circuitry to said at least one clock control signal.

18. The apparatus of claim 15, wherein said plurality of subcircuits further includes data storage circuitry responsive to a deactivation of said first clock signal by retaining, until a reactivation of said first clock signal, a plurality of data having respective data states determined by said execution of said one or more decoded instructions prior to said response by said control circuitry to said one or more incoming control signals.

19. The apparatus of claim 15, wherein said plurality of subcircuits further includes data storage circuitry responsive to a deactivation of said first clock signal by retaining, until a reactivation of said first clock signal, a plurality of data having respective data states determined by said execution of said one or more decoded instructions prior to said response by said clock circuitry to said at least one clock control signal.

20. The apparatus of claim 15, wherein said plurality of subcircuits further includes data storage circuitry responsive to a reactivation following a deactivation of said first clock signal by providing a plurality of data having respective retained data states determined by said execution of said one or more decoded instructions prior to said response by said control circuitry to said one or more incoming control signals.

21. The apparatus of claim 15, wherein said plurality of subcircuits further includes data storage circuitry responsive to a reactivation following a deactivation of said first clock signal by providing a plurality of data having respective retained data states determined by said execution of said one or more decoded instructions prior to said response by said clock circuitry to said at least one clock control signal.

22. An apparatus including integrated processor circuitry, said apparatus comprising:

interface means for conveying one or more incoming control signals from at least one signal source having at least a first combination of respective assertion and de-assertion states corresponding to a power management operation mode;

controller means for responding to said one or more incoming control signals by generating at least one clock control signal having respective assertion and de-assertion states related to said one or more incoming control signal assertion and de-assertion states with said respective assertion states following said first incoming control signal states combination;

clock source means for responding to said at least one clock control signal by generating at least a first clock signal having active and inactive states corresponding to said at least one clock control signal de-assertion and assertion state, respectively; and subcircuit means including pipeline means for responding to said first clock signal by selectively operating on one or more instructions for data processing, wherein
- a first portion of said pipeline means is for responding to said active first clock signal by performing at least one or more respective portion of one or more decoding operations upon each one of at least one or more respective portions of one or more incoming instructions to provide one or more decoded instructions, and
- a second portion of said pipeline means is for responding to said active first clock signal by executing said one or more decoded instructions.

23. An apparatus including integrated processor circuitry, said apparatus comprising:

a plurality of interface electrodes including one or more control electrodes to convey one or more incoming control signals from at least one signal source having at least a first combination of respective assertion and de-assertion states corresponding to a power management operation mode;

control circuitry coupled to said one or more control electrodes and responsive to said one or more incoming control signals by providing at least one lock control signal having respective assertion and de-assertion states related to said one or more incoming control signal assertion and de-assertion states;

clock circuitry coupled to said control circuitry and responsive to said at least one clock control signal by providing at least a first clock signal having active and inactive states corresponding to said at least one clock control signal de-assertion and assertion states, respectively, with said inactive state following said first incoming control signal states combination; and a plurality of subcircuits coupled to at least a portion of said plurality of interface electrodes, said control circuitry and said clock circuitry, and including pipeline subcircuitry responsive to said first clock signal by selectively operating on one or more instructions for data processing, wherein
- a first portion of said pipeline subcircuitry is responsive to said active first clock signal by performing at least one or more respective portion of one or more decoding operations upon each one of at least one or more respective portions of one or more incoming instructions to provide one or more decoded instructions, and
- a second portion of said pipeline subcircuitry is couple to said first pipeline subcircuitry portion and responsive to said active first clock signal by executing said one or more decoded instructions.

24. The apparatus of claim 23, wherein said control circuitry further provides a status signal indicative of said first clock signal inactive state.

25. The apparatus of claim 23, wherein said control circuitry comprises logic circuitry that converts said one or more incoming control signals to said at least one clock control signal.

26. The apparatus of claim 23, wherein said control circuitry comprises at least one register in which said one or more incoming control signals is stored to provide said at least one clock control signal.

27. The apparatus of claim 23, wherein said clock circuitry further provides a second clock signal with active and inactive states substantially independent of said at least one clock control signal assertion and de-assertion states.

28. The apparatus of claim 23, wherein said first pipeline subcircuitry portion comprises decoding circuitry.

29. The apparatus of claim 23, wherein said second pipeline subcircuitry portion comprises arithmetic logic circuitry.

30. The apparatus of claim 23, wherein said control and clock circuitries together are responsive to a second combination of said one or more incoming control signal assertion and de-assertion states by providing said first clock signal in said active state.

31. The apparatus of claim 23, wherein said plurality of subcircuits further includes data storage circuitry responsive to a deactivation of said first clock signal by retaining a plurality of data having respective data states determined by said execution of said one or more decoded instructions prior to said response by said control circuitry to said one or more incoming control signals.

32. The apparatus of claim 23, wherein said plurality of subcircuits further includes data storage circuitry responsive to a deactivation of said first clock signal by retaining a plurality of data having respective data states determined by said execution of said one or more decoded instructions prior to said response by said clock circuitry to said at least one clock control signal.

33. The apparatus of claim 23, wherein said plurality of subcircuits further includes data storage circuitry responsive to a deactivation of said first clock signal by retaining, until a reactivation of said first clock signal, a plurality of data having respective data states determined by said execution of said one or more decoded instructions prior to said response by said control circuitry to said one or more incoming control signals.

34. The apparatus of claim 23, wherein said plurality of subcircuits further includes data storage circuitry responsive to a deactivation of said first clock signal by retaining, until a reactivation of said first clock signal, a plurality of data having respective data states determined by said execution of said one or more decoded instructions prior to said response by said clock circuitry to said at least one clock control signal.

35. The apparatus of claim 23, wherein said plurality of subcircuits further includes data storage circuitry responsive to a reactivation following a deactivation of said first clock signal by providing a plurality of data having respective retained data states determined by said execution of said one or more decoded instructions prior to said response by said control circuitry to said one or more incoming control signals.

36. The apparatus of claim 23, wherein said plurality of subcircuits further includes data storage circuitry responsive to a reactivation following a deactivation of said first clock signal by providing a plurality of data having respective retained data states determined by said execution of said one or more decoded instructions prior to said response by said clock circuitry to said at least one clock control signal.

37. The apparatus of claim 23, wherein said clock circuitry provides said first clock signal in said inactive state following:
   said first combination of said one or more incoming control signal assertion and de-assertion states; and
   completion of
      said performance, initiated prior to said first combination of said one or more incoming control signal assertion and de-assertion states, by said first pipeline subcircuitry portion of said at least one or more respective portions of said one or more decoding operations to provide said one or more decoded instructions, and
      said execution by said second pipeline subcircuitry portion of said one or more decoded instructions.

38. The apparatus of claim 37, wherein said plurality of subcircuits further includes data storage circuitry responsive to a deactivation of said first clock signal by retaining a plurality of data having respective data states determined by said execution of said one or more decoded instructions prior to said response by said control circuitry to said one or more incoming control signals.

39. The apparatus of claim 37, wherein said plurality of subcircuits further includes data storage circuitry responsive to a deactivation of said first clock signal by retaining a plurality of data having respective data states determined by said execution of said one or more decoded instructions prior to said response by said clock circuitry to said at least one clock control signal.

40. The apparatus of claim 37, wherein said plurality of subcircuits further includes data storage circuitry responsive to a deactivation of said first clock signal by retaining, until a reactivation of said first clock signal, a plurality of data having respective data states determined by said execution of said one or more decoded instructions prior to said response by said control circuitry to said one or more incoming control signals.

41. The apparatus of claim 37, wherein said plurality of subcircuits further includes data storage circuitry responsive to a deactivation of said first clock signal by retaining, until a reactivation of said first clock signal, a plurality of data having respective data states determined by said execution of said one or more decoded instructions prior to said response by said clock circuitry to said at least one clock control signal.

42. The apparatus of claim 37, wherein said plurality of subcircuits further includes data storage circuitry responsive to a reactivation following a deactivation of said first clock signal by providing a plurality of data having respective retained data states determined by said execution of said one or more decoded instructions prior to said response by said control circuitry to said one or more incoming control signals.

43. The apparatus of claim 37, wherein said plurality of subcircuits further includes data storage circuitry responsive to a reactivation following a deactivation of said first clock signal by providing a plurality of data having respective retained data states determined by said execution of said one or more decoded instructions prior to said response by said clock circuitry to said at least one clock control signal.

44. An apparatus including integrated processor circuitry, said apparatus comprising:
   interface means for conveying one or more incoming control signals from at least one signal source having at least a first combination of respective assertion and de-assertion states corresponding to a power management operation mode;
   controller means for responding to said one or more incoming control signals by generating at least one clock control signal having respective assertion and de-assertion states related to said one or more incoming control signal assertion and de-assertion states;
   clock source means for responding to said at least one clock control signal by generating at least a first clock signal having active and inactive states corresponding to said at least one clock control signal de-assertion and assertion state, respectively, with said inactive state following said first incoming control signal states combination; and
   subcircuit means including pipeline means for responding to said first clock signal by selectively operating on one or more instructions for data processing, wherein
      a first portion of said pipeline means is for responding to said active first clock signal by performing at least one or more respective portion of one or more decoding operations upon each one of at least one or more respective portions of one or more incoming instructions to provide one or more decoded instructions, and
      a second portion of said pipeline means is for responding to said active first clock signal by executing said one or more decoded instructions.

45. An apparatus including integrated processor circuitry, said apparatus comprising:
   a plurality of interface electrodes including one or more control electrodes to convey one or more incoming control signals from at least one signal source having at least a first combination of respective assertion and de-assertion states corresponding to a power management operation mode;
   control circuitry coupled to said one or more control electrodes and responsive to said one or more incoming control signals by providing at least one lock control signal having respective assertion and de-assertion states related to said one or more incoming control signal assertion and de-assertion states with said respective assertion states following said first incoming control signal states combination;
   clock circuitry coupled to said control circuitry and responsive of said at least one clock control signal by providing at least a first clock signal having an active state having a plurality of successive cycles and an inactive state having substantially zero cycles corresponding to said at least one clock control signal de-assertion and assertion states, respectively; and
   a plurality of subcircuits coupled to at least a portion of said plurality of interface electrodes, said control circuitry and said clock circuitry, and including pipeline subcircuitry responsive to said first clock signal by selectively operating on one or more instructions for data processing, wherein
      a first portion of said pipeline subcircuitry is responsive to at least a first one of said plurality of first clock signal cycles by performing at least one or more respective portions of one or more decoding operations upon each one of at least one or more respective portions of one or more incoming instructions provide one or more decoded instructions, and
      a second portion of said pipeline subcircuitry is couple to said first pipeline subcircuitry portion and responsive to at least a second one subsequent to said first one of said plurality of first clock signal cycles by executing said one or more decoded instructions.

46. The apparatus of claim 45, wherein said control circuitry further provides a status signal indicative of said respective assertion states of said at least one clock control signal.

47. The apparatus of claim 45, wherein said control circuitry comprises logic circuitry that converts said one or more incoming control signals to said at least one clock control signal.

48. The apparatus of claim 45, wherein said control circuitry comprises at least one register in which said one or more incoming control signals is stored to provide said at least one clock control signal.

49. The apparatus of claim 45, wherein said clock circuitry further provides a second clock signal with active and inactive states substantially independent of said at least one clock control signal assertion and de-assertion states.

50. The apparatus of claim 45, wherein said first pipeline subcircuitry portion comprises decoding circuitry.

51. The apparatus of claim 45, wherein said second pipeline subcircuitry portion comprises arithmetic logic circuitry.

52. The apparatus of claim 45, wherein said control circuitry is responsive to a second combination of said one or more incoming control signal assertion and de-assertion states by providing said at least one clock control signal in said respective de-assertion states.

53. The apparatus of claim 45, wherein said plurality of subcircuits further includes data storage circuitry responsive to a deactivation of said first clock signal by retaining a plurality of data having respective data states determined by said execution of said one or more decoded instructions prior to said response by said control circuitry to said one or more incoming control signals.

54. The apparatus of claim 45, wherein said plurality of subcircuits further includes data storage circuitry responsive to a deactivation of said first clock signal by retaining a plurality of data having respective data states determined by said execution of said one or more decoded instructions prior to said response by said clock circuitry to said at least one clock control signal.

55. The apparatus of claim 45, wherein said plurality of subcircuits further includes data storage circuitry responsive to a deactivation of said first clock signal by retaining, until a reactivation of said first clock signal, a plurality of data having respective data states determined by said execution of said one or more decoded instructions prior to said response by said control circuitry to said one or more incoming control signals.

56. The apparatus of claim 45, wherein said plurality of subcircuits further includes data storage circuitry responsive to a deactivation of said first clock signal by retaining, until a reactivation of said first clock signal, a plurality of data having respective data states determined by said execution of said one or more decoded instructions prior to said response by said clock circuitry to said at least one clock control signal.

57. The apparatus of claim 45, wherein said plurality of subcircuits further includes data storage circuitry responsive to a reactivation following a deactivation of said first clock signal by providing a plurality of data having respective retained data states determined by said execution of said one or more decoded instructions prior to said response by said control circuitry to said one or more incoming control signals.

58. The apparatus of claim 45, wherein said plurality of subcircuits further includes data storage circuitry responsive to a reactivation following a deactivation of said first clock signal by providing a plurality of data having respective retained data states determined by said execution of said one or more decoded instructions prior to said response by said clock circuitry to said at least one clock control signal.

59. The apparatus of claim 45, wherein said control circuitry provides said at least one clock control signal in said respective assertion states following:
    said first combination of said one or more incoming control signal assertion and de-assertion states; and
    completion of
        said performance, initiated prior to said first combination of said one or more incoming control signal assertion and de-assertion states, by said first pipeline subcircuitry portion of said at least one or more respective portions of said one or more decoding operations to provide said one or more decoded instructions, and
        said execution by said second pipeline subcircuitry portion of said one or more decoded instructions.

60. The apparatus of claim 59, wherein said plurality of subcircuits further includes data storage circuitry responsive to a deactivation of said first clock signal by retaining a plurality of data having respective data states determined by said execution of said one or more decoded instructions prior to said response by said control circuitry to said one or more incoming control signals.

61. The apparatus of claim 59, wherein said plurality of subcircuits further includes data storage circuitry responsive to a deactivation of said first clock signal by retaining a plurality of data having respective data states determined by said execution of said one or more decoded instructions prior to said response by said clock circuitry to said at least one clock control signal.

62. The apparatus of claim 59, wherein said plurality of subcircuits further includes data storage circuitry responsive to a deactivation of said first clock signal by retaining, until a reactivation of said first clock signal, a plurality of data having respective data states determined by said execution of said one or more decoded instructions prior to said response by said control circuitry to said one or more incoming control signals.

63. The apparatus of claim 59, wherein said plurality of subcircuits further includes data storage circuitry responsive to a deactivation of said first clock signal by retaining, until a reactivation of said first clock signal, a plurality of data having respective data states determined by said execution of said one or more decoded instructions prior to said response by said clock circuitry to said at least one clock control signal.

64. The apparatus of claim 59, wherein said plurality of subcircuits further includes data storage circuitry responsive to a reactivation following a deactivation of said first clock signal by providing a plurality of data having respective retained data states determined by said execution of said one or more decoded instructions prior to said response by said control circuitry to said one or more incoming control signals.

65. The apparatus of claim 59, wherein said plurality of subcircuits further includes data storage circuitry responsive to a reactivation following a deactivation of said first clock signal by providing a plurality of data having respective retained data states determined by said execution of said one or more decoded instructions prior to said response by said clock circuitry to said at least one clock control signal.

66. An apparatus including integrated processor circuitry, said apparatus comprising:
- interface means for conveying one or more incoming control signals from at least one signal source having at least a first combination of respective assertion and de-assertion states corresponding to a power management operation mode;
- controller means for responding to said one or more incoming control signals by generating at least one clock control signal having respective assertion and de-assertion states related to said one or more incoming control signal assertion and de-assertion states with said respective assertion states following said first incoming control signal states combination;
- clock source means for responding to said at least one clock control signal by generating at least a first clock signal having an active state having a plurality of successive cycles and an inactive state having substantially zero cycle corresponding to said at least one clock control signal de-assertion and assertion states, respectively; and
- subcircuit means including pipeline means for responding to said first clock signal by selectively operating on one or more instructions for data processing, wherein
  - a first portion of said pipeline means is for responding at least a first one of said plurality of first clock signal cycles by performing at least one or more respective portions of one or more decoding operations upon each one of at least one or more respective portions of one or more incoming instructions to provide one or more decoded instructions, and
  - a second portion of said pipeline means is for responding to at least a second one subsequent to said first one of said plurality of first clock signal cycles by executing said one or more decoded instructions.

67. An apparatus including integrated processor circuitry, said apparatus comprising:
- a plurality of interface electrodes including one or more control electrodes to convey one or more incoming control signals from at least one signal source having at least a first combination of respective assertion and de-assertion states corresponding to a power management operation mode;
- control circuitry coupled to said one or more control electrodes and responsive to said one or more incoming control signals by providing at least one lock control signal having respective assertion and de-assertion states related to said one or more incoming control signal assertion and de-assertion states;
- clock circuitry coupled to said control circuitry and responsive a said at least one clock control signal by providing at least a first clock signal with n active state having a plurality of successive cycles and an inactive state having substantially zero cycles corresponding to said at least one clock control signal de-assert on and assertion states, respectively, with said inactive state following said first incoming control signal states combination; and
- a plurality of subcircuits coupled to at least a portion of said plurality of interface electrodes, said control circuitry and said clock circuitry, and including pipeline subcircuitry responsive to said first clock signal by selectively operating on one or more instructions for data processing, wherein
  - a first portion of said pipeline subcircuitry is responsive to at least a first one of said plurality of first clock signal cycles by performing at least one or more respective portions of one or more decoding operations upon each one of at least one or more respective portions of one or more incoming instructions provide one or more decoded instructions, and
  - a second portion of said pipeline subcircuitry is couple to said first pipeline subcircuitry portion and responsive to at least a second one su sequent to said first one of said plurality of first clock signal cycles by executing said one or more decoded instructions.

68. The apparatus of claim 67, wherein said control circuitry further provides a status signal indicative of said first clock signal inactive state.

69. The apparatus of claim 67, wherein said control circuitry comprises logic circuitry that converts said one or more incoming control signals to said at least one clock control signal.

70. The apparatus of claim 67, wherein said control circuitry comprises at least one register in which said one or more incoming control signals is stored to provide said at least one clock control signal.

71. The apparatus of claim 67, wherein said clock circuitry further provides a second clock signal with active and inactive states substantially independent of said at least one clock control signal assertion and de-assertion states.

72. The apparatus of claim 67, wherein said first pipeline subcircuitry portion comprises decoding circuitry.

73. The apparatus of claim 67, wherein said second pipeline subcircuitry portion comprises arithmetic logic circuitry.

74. The apparatus of claim 67, wherein said control and clock circuitries together are responsive to a second combination of said one or more incoming control signal assertion and de-assertion states by providing said first clock signal in said active state.

75. The apparatus of claim 67, wherein said plurality of subcircuits further includes data storage circuitry responsive to a deactivation of said first clock signal by retaining a plurality of data having respective data states determined by said execution of said one or more decoded instructions prior to said response by said control circuitry to said one or more incoming control signals.

76. The apparatus of claim 67, wherein said plurality of subcircuits further includes data storage circuitry responsive to a deactivation of said first clock signal by retaining a plurality of data having respective data states determined by said execution of said one or more decoded instructions prior to said response by said clock circuitry to said at least one clock control signal.

77. The apparatus of claim 67, wherein said plurality of subcircuits further includes data storage circuitry responsive to a deactivation of said first clock signal by retaining, until a reactivation of said first clock signal, a plurality of data having respective data states determined by said execution of said one or more decoded instructions prior to said response by said control circuitry to said one or more incoming control signals.

78. The apparatus of claim 67, wherein said plurality of subcircuits further includes data storage circuitry responsive to a deactivation of said first clock signal by retaining, until a reactivation of said first clock signal, a plurality of data having respective data states determined by said execution of said one or more decoded instructions prior to said response by said clock circuitry to said at least one clock control signal.

79. The apparatus of claim 67, wherein said plurality of subcircuits further includes data storage circuitry responsive to a reactivation following a deactivation of said first clock signal by providing a plurality of data having respective retained data states determined by said execution of said one or more decoded instructions prior to said response by said control circuitry to said one or more incoming control signals.

80. The apparatus of claim 67, wherein said plurality of subcircuits further includes data storage circuitry responsive to a reactivation following a deactivation of said first clock signal by providing a plurality of data having respective retained data states determined by said execution of said one or more decoded instructions prior to said response by said clock circuitry to said at least one clock control signal.

81. The apparatus of claim 67, wherein said clock circuitry provides said first clock signal in said inactive state following:
    said first combination of said one or more incoming control signal assertion and de-assertion states; and
    completion of
        said performance, initiated prior to said first combination of said one or more incoming control signal assertion and de-assertion states, by said first pipeline subcircuitry portion of said at least one or more respective portions of said one or more decoding operations to provide said one or more decoded instructions, and
        said execution by said second pipeline subcircuitry portion of said one or more decoded instructions.

82. The apparatus of claim 81, wherein said plurality of subcircuits further includes data storage circuitry responsive to a deactivation of said first clock signal by retaining a plurality of data having respective data states determined by said execution of said one or more decoded instruction prior to said response by said control circuitry to said one or more incoming control signals.

83. The apparatus of claim 81, wherein said plurality of subcircuits further includes data storage circuitry responsive to a deactivation of said first clock signal by retaining a plurality of data having respective data states determined by said execution of said one or more decoded instructions prior to said response by said clock circuitry to said at least one clock control signal.

84. The apparatus of claim 81, wherein said plurality of subcircuits further includes data storage circuitry responsive to a deactivation of said first clock signal by retaining, until a reactivation of said first clock signal, a plurality of data having respective data states determined by said execution of said one or more decoded instructions prior to said response by said control circuitry to said one or more incoming control signals.

85. The apparatus of claim 81, wherein said plurality of subcircuits further includes data storage circuitry responsive to a deactivation of said first clock signal by retaining, until a reactivation of said first clock signal, a plurality of data having respective data states determined by said execution of said one or more decoded instructions prior to said response by said clock circuitry to said at least one clock control signal.

86. The apparatus of claim 81, wherein said plurality of subcircuits further includes data storage circuitry responsive to a reactivation following a deactivation of said first clock signal by providing a plurality of data having respective retained data states determined by said execution of said one or more decoded instructions prior to said response by said control circuitry to said one or more incoming control signals.

87. The apparatus of claim 81, wherein said plurality of subcircuits further includes data storage circuitry responsive to a reactivation following a deactivation of said first clock signal by providing a plurality of data having respective retained data states determined by said execution of said one or more decoded instructions prior to said response by said clock circuitry to said at least one clock control signal.

88. An apparatus including integrated processor circuitry, said apparatus comprising:
    interface means for conveying one or more incoming control signals from at least one signal source having at least a first combination of respective assertion and de-assertion states corresponding to a power management operation mode;
    controller means for responding to said one or more incoming control signals by generating at least one clock control signal having respective assertion and de-assertion states related to said one or more incoming control signal assertion and de-assertion states;
    clock source means for responding to said at least one clock control signal by generating at least a first clock signal with an active state having a plurality of successive cycles and an inactive state having substantially zero cycle corresponding to said at least one clock control signal de-assertion and assertion states, respectively, with said inactive state following said first incoming control signal states combination; and
    subcircuit means including pipeline means for responding to said first clock signal by selectively operating on one or more instructions for data processing, wherein
        a first portion of said pipeline means is for responding to at least a first one of said plurality of first clock signal cycles by performing at least one or more respective portions of one or more decoding operations upon each one of at least one or more respective portions of one or more incoming instructions to provide one or more decoded instructions, and
        a second portion of said pipeline means is for responding to at least a second one subsequent to said first one of said plurality of first clock signal cycles by executing said one or more decoded instructions.

89. An apparatus including integrated processor circuitry, said apparatus comprising:
    a plurality of interface electrodes including one or more control electrodes to convey one or more incoming control signals from at least one signal source having at least a first combination of respective assertion and de-assertion states corresponding to a power management operation mode;
    control circuitry coupled to said one or more control electrodes and responsive to said one or more incoming control signals and a first clock signal by providing at least one clock control signal having respective assertion and de-assertion states related to said one or more incoming control signal assertion and de-assertion states with said respective assertion states following said first incoming control signal states combination;
    clock circuitry coupled to said control circuitry and responsive of said at least one clock control signal by providing said first clock signal having active and inactive states substantially independent of said at least one clock control signal assertion and de-assertion states, and a second clock signal having active and inactive states corresponding to said at least one clock control signal de-assertion and assertion states, respectively; and
    a plurality of subcircuits coupled to at least a portion of said plurality of interface electrodes, said control circuitry and said clock circuitry, and including pipeline subcircuitry responsive to said active second clock signal by executing one or more instructions for data processing.

90. The apparatus of claim 89, wherein said control circuitry further provides a status signal indicative of said respective assertion states of said at least one clock control signal.

91. The apparatus of claim 89, wherein said control circuitry comprises logic circuitry that converts said one or more incoming control signals to said at least one clock control signal.

92. The apparatus of claim 89, wherein said control circuitry comprises at least one register in which said one or more incoming control signals is stored to provide said at least one clock control signal.

93. The apparatus of claim 89, wherein said pipeline subcircuitry comprises decoding circuitry.

94. The apparatus of claim 89, wherein said pipeline subcircuitry comprises arithmetic logic circuitry.

95. The apparatus of claim 89, wherein said control circuitry is responsive to a second combination of said one or more incoming control signal assertion and de-assertion states by providing said at least one clock control signal in said respective de-assertion states.

96. The apparatus of claim 89, wherein said plurality of subcircuits further includes data storage circuitry responsive to a deactivation of said second clock signal by retaining a plurality of data having respective data states determined by said execution of said one or more decoded instruction prior to said response by said control circuitry to said one or more incoming control signals.

97. The apparatus of claim 89, wherein said plurality of subcircuits further includes data storage circuitry responsive to a deactivation of said second clock signal by retaining a plurality of data having respective data states determined by said execution of said one or more decoded instruction prior to said response by said clock circuitry to said at least one clock control signal.

98. The apparatus of claim 89, wherein said plurality of subcircuits further includes data storage circuitry responsive to a deactivation of said second clock signal by retaining, until a reactivation of said second clock signal, a plurality of data having respective data states determined by said execution of said one or more decoded instructions prior to said response by said control circuitry to said one or more incoming control signals.

99. The apparatus of claim 89, wherein said plurality of subcircuits further includes data storage circuitry responsive to a deactivation of said second clock signal by retaining, until a reactivation of said second clock signal, a plurality of data having respective data states determined by said execution of said one or more decoded instructions prior to said response by said clock circuitry to said at least one clock control signal.

100. The apparatus of claim 89, wherein said plurality of subcircuits further includes data storage circuitry responsive to a reactivation following a deactivation of said second clock signal by providing a plurality of data having respective retained data states determined by said execution of said one or more decoded instructions prior to said response by said control circuitry to said one or more incoming control signals.

101. The apparatus of claim 89, wherein said plurality of subcircuits further includes data storage circuitry responsive to a reactivation following a deactivation of said second clock signal by providing a plurality of data having respective retained data states determined by said execution of said one or more decoded instructions prior to said response by said clock circuitry to said at least one clock control signal.

102. The apparatus of claim 89, wherein said control circuitry provides said at least one clock control signal in said respective assertion states following:
   said first combination of said one or more incoming control signal assertion and de-assertion states; and
   completion of said execution of said one or more instructions for data processing initiated prior to said first combination of said one or more coming control signal assertion and de-assertion states.

103. The apparatus of claim 102, wherein said plurality of subcircuits further includes data storage circuitry responsive to a deactivation of said second clock signal by retaining a plurality of data having respective data states determined by said execution of said one or more decoded instructions prior to said response by said control circuitry to said one or more incoming control signals.

104. The apparatus of claim 102, wherein said plurality of subcircuits further includes data storage circuitry responsive to a deactivation of said second clock signal by retaining a plurality of data having respective data states determined by said execution of said one or more decoded instruction prior to said response by said clock circuitry to said at least one clock control signal.

105. The apparatus of claim 102, wherein said plurality of subcircuits further includes data storage circuitry responsive to a deactivation of said second clock signal by retaining, until a reactivation of said second clock signal, a plurality of data having respective data states determined by said execution of said one or more decoded instructions prior to said response by said control circuitry to said one or more incoming control signals.

106. The apparatus of claim 102, wherein said plurality of subcircuits further includes data storage circuitry responsive to a deactivation of said second clock signal by retaining, until a reactivation of said second clock signal, a plurality of data having respective data states determined by said execution of said one or more decoded instructions prior to said response by said clock circuitry to said at least one clock control signal.

107. The apparatus of claim 102, wherein said plurality of subcircuits further includes data storage circuitry responsive to a reactivation following a deactivation of said second clock signal by providing a plurality of data having respective retained data states determined by said execution of said one or more decoded instructions prior to said response by said control circuitry to said one or more incoming control signals.

108. The apparatus of claim 102, wherein said plurality of subcircuits further includes data storage circuitry responsive to a reactivation following a deactivation of said second clock signal by providing a plurality of data having respective retained data states determined by said execution of said one or more decoded instructions prior to said response by said clock circuitry to said at least one clock control signal.

109. An apparatus including integrated processor circuitry, said apparatus comprising:
   interface means for conveying one or more incoming control signals from at least one signal source having at least a first combination of respective assertion and de-assertion states corresponding to a power management operation mode;
   controller means for responding to said one or more incoming control signals and a first clock signal by generating at least one clock control signal having respective assertion and de-assertion states related to said one or more incoming control signal assertion and de-assertion states with said respective assertion states following said first incoming control signal states combination;

clock source means for responding to said at least one clock control signal by generating said first clock signal having active and inactive states substantially independent of said at least one clock control signal assertion and de-assertion states, and a second clock signal having active and inactive states corresponding to said at least one clock control signal de-assertion and assertion states, respectively; and subcircuit means including pipeline means for responding to said active second clock signal by executing one or more instructions for data processing.

110. An apparatus including integrated processor circuitry, said apparatus comprising:
a plurality of interface electrodes including one or more control electrodes to convey one or more incoming control signals from at least one signal source having at least a first combination of respective assertion and de-assertion states corresponding to a power management operation mode;
control circuitry coupled to said one or more control electrodes and responsive to said one or more incoming control signals and a first clock signal by providing at least one clock control signal having respective assertion and de-assert on states related to said one or more incoming control signal assertion and de-assertion states;
clock circuitry coupled to said control circuitry and responsive of said at least one clock control signal by providing said first clock signal having active and inactive states substantially independent of said at least one clock control sign assertion and de-assertion states, and a second clock signal having active and inactive states corresponding to said at least one clock control signal de-assertion an assertion states, respectively, with said second clock signal inactive state following said first incoming control signal states combination; and
a plurality of subcircuits coupled to at least a portion of said plurality of interface electrodes, said control circuitry and said clock circuitry, and including pipeline subcircuitry responsive to said active second clock signal by executing one or more instructions for data processing.

111. The apparatus of claim 110, wherein said control circuitry further provides a status signal indicative of said second clock signal inactive state.

112. The apparatus of claim 110, wherein said control circuitry comprises logic circuitry that converts said one or more incoming control signals to said at least one clock control signal.

113. The apparatus of claim 110, wherein said control circuitry comprises at least one register in which said one or more incoming control signals is stored to provide said at least one clock control signal.

114. The apparatus of claim 110, wherein said pipeline subcircuitry comprises decoding circuitry.

115. The apparatus of claim 110, wherein said pipeline subcircuitry comprises arithmetic logic circuitry.

116. The apparatus of claim 110, wherein said control and clock circuitries together are responsive to a second combination of said one or more incoming control signal assertion and de-assertion states by providing said second clock signal in said active state.

117. The apparatus of claim 110, wherein said plurality of subcircuits further includes data storage circuitry responsive to a deactivation of said second clock signal by retaining a plurality of data having respective d data states determined by said execution of said one or more decoded instructions prior to said response by said control circuitry to said one or more incoming control signals.

118. The apparatus of claim 110, wherein said plurality of subcircuits further includes data storage circuitry responsive to a deactivation of said second clock signal by retaining a plurality of data having respective d data states determined by said execution of said one or more decoded instructions prior to said response by said clock circuitry to said at least one clock control signal.

119. The apparatus of claim 110, wherein said plurality of subcircuits further includes data storage circuitry responsive to a deactivation of said second clock signal by retaining, until a reactivation of said second clock signal, a plurality of data having respective data states determined by said execution of said one or more decoded instructions prior to said response by said control circuitry to said one or more incoming control signals.

120. The apparatus of claim 110, wherein said plurality of subcircuits further includes data storage circuitry responsive to a deactivation of said second clock signal by retaining, until a reactivation of said second clock signal, a plurality of data having respective data states determined by said execution of said one or more decoded instructions prior to said response by said clock circuitry to said at least one clock control signal.

121. The apparatus of claim 110, wherein said plurality of subcircuits further includes data storage circuitry responsive to a reactivation following a deactivation of said second clock signal by providing a plurality of data having respective retained data states determined by said execution of said one or more decoded instructions prior to said response by said control circuitry to said one or more incoming control signals.

122. The apparatus of claim 110, wherein said plurality of subcircuits further includes data storage circuitry responsive to a reactivation following a deactivation of said second clock signal by providing a plurality of data having respective retained data states determined by said execution of said one or more decoded instructions prior to said response by said clock circuitry to said at least one clock control signal.

123. The apparatus of claim 110, wherein said clock circuitry provides said first and second clock signals in said active and inactive states, respectively, following:
said first combination of said one or more incoming control signal assertion and de-assertion states; and
completion of said execution of said one or more instructions for data processing initiated prior to said first combination of said one or more incoming control signal assertion and de-assertion states.

124. The apparatus of claim 123, wherein said plurality of subcircuits further includes data storage circuitry responsive to a deactivation of said second clock signal by retaining a plurality of data having respective data states determined by said execution of said one or more decoded instructions prior to said response by said control circuitry to said one or more incoming control signals.

125. The apparatus of claim 123, wherein said plurality of subcircuits further includes data storage circuitry responsive to a deactivation of said second clock signal by retaining a plurality of data having respective data states determined by said execution of said one or more decoded instruction prior to said response by said clock circuitry to said at least one clock control signal.

126. The apparatus of claim 123, wherein said plurality of subcircuits further includes data storage circuitry responsive to a deactivation of said second clock signal by retaining, until a reactivation of said second clock signal, a plurality of data having respective data states determined by said execution of said one or more decoded instructions prior to said response by said control circuitry to said one or more incoming control signals.

127. The apparatus of claim 123, wherein said plurality of subcircuits further includes data storage circuitry responsive to a deactivation of said second clock signal by retaining, until a reactivation of said second clock signal, a plurality of data having respective data states determined by said execution of said one or more decoded instructions prior to said response by said clock circuitry to said at least one clock control signal.

128. The apparatus of claim 123, wherein said plurality of subcircuits further includes data storage circuitry responsive to a reactivation following a deactivation of said second clock signal by providing a plurality of data having respective retained data states determined by said execution of said one or more decoded instructions prior to said response by said control circuitry to said one or more incoming control signals.

129. The apparatus of claim 123, wherein said plurality of subcircuits further includes data storage circuitry responsive to a reactivation following a deactivation of said second clock signal by providing a plurality of data having respective retained data states determined by said execution of said one or more decoded instructions prior to said response by said clock circuitry to said at least one clock control signal.

130. An apparatus including integrated processor circuitry, said apparatus comprising:

interface means for conveying one or more incoming control signals from at least one signal source having at least a first combination of respective assertion and de-assertion states corresponding to a power management operation mode;

controller means for responding to said one or more incoming control signals and a first clock signal by providing at least one clock control signal having respective assertion and de-assertion states related to said one or more incoming control signal assertion and de-assertion states;

clock source means for responding to said at least one clock control signal by generating said first clock signal having active and inactive states substantially independent of said at least one clock control signal assertion and de-assertion states, and a second clock signal having active and inactive states corresponding to said at least one clock control signal de-assertion and assertion states, respectively, with said second clock signal inactive state following said first incoming control signal states combination; and subcircuit means including pipeline means for responding to said active second clock signal by executing one or more instructions for data processing.

* * * * *

UNITED STATES PATENT AND TRADEMARK OFFICE
CERTIFICATE OF CORRECTION

PATENT NO. : 6,910,141 B2
DATED : June 21, 2005
INVENTOR(S) : Robert Maher et al.

It is certified that error appears in the above-identified patent and that said Letters Patent is hereby corrected as shown below:

Title page,
Item [62], Related U.S. Application Data, please delete, "Division of application No. 10/216,615, filed on Aug. 9, 2002, now Pat. No. 6,721,894" and insert -- Division of application No. 10/216,615, filed on Aug. 9, 2002, now Pat. No. 6,721,894 which is a division of application No. 09/779,150, filed on Feb. 8, 2001, now Pat. No. 6,694,443 which is a division of application No. 09/570,155, filed on May 12, 2000, now Pat. No. 6,343,363 which is a continuation of application No. 08/777,772, filed on December 9, 1996, now Pat. No. 6,088,807 which is a division of application No. 08/310,895, filed on Sept. 22, 1994, now Pat. No. 5,630,143 which is a continuation of application No. 07/858,579, filed on March 27, 1992 which is now abandoned --.
Item [57], ABSTRACT,
Line 5, after "by" and before "disabling" insert -- selectively --.

Column 1,
Line 67, delete "pipeline", and insert -- pipelined --.

Column 2,
Line 7, after "invention" insert -- , --.
Line 8, delete "f" and insert -- of --.
Line 10, delete "type".
Line 11, delete "electrode" and insert -- electrodes --.
Line 19, delete "ass on" and insert -- assertion --.
Line 21, delete "coming" and insert -- incoming --.
Line 36, after "instructions" insert -- , and a --.
Line 38, delete "e".
Line 43, delete "in".
Line 45, delete "mean" and insert -- means --.
Line 60, after "for" and before "to" insert -- responding --.

Column 3,
Line 9, delete "electrode" and insert -- electrodes --.
Line 34, delete "an" and insert -- and --.

UNITED STATES PATENT AND TRADEMARK OFFICE
CERTIFICATE OF CORRECTION

PATENT NO.    : 6,910,141 B2
DATED         : June 21, 2005
INVENTOR(S)   : Robert Maher et al.

It is certified that error appears in the above-identified patent and that said Letters Patent is hereby corrected as shown below:

Column 4,
Line 6, delete "electrode" and insert -- electrodes --.
Line 16, delete "coming" and insert -- incoming --.
Line 43, delete "mean" and insert -- means --.
Line 56, delete "substantial" and insert -- substantially --.

Column 5,
Line 2, delete "firs" and insert -- first --.
Line 9, delete "electrode" and insert -- electrodes --.

Column 6,
Line 3, after "instructions" insert -- , --.
Line 8, delete "claim" and insert -- claimed --, after "invention" insert -- , --.
Line 37, after "invention" insert -- , --.
Line 66, delete "electrode" and insert -- electrodes --.

Column 7,
Line 21, delete "instruction," and insert -- instructions --.

Column 8,
Line 10, delete "e".

Column 10,
Line 13, delete "e".
Line 27, delete "F SUSP" and insert -- F_SUSP --.

Column 12,
Line 41, delete "lock" and insert -- clock --.
Line 48, delete "o" and insert -- to --.
Line 66, delete "couple" and insert -- coupled --.

UNITED STATES PATENT AND TRADEMARK OFFICE
CERTIFICATE OF CORRECTION

PATENT NO. : 6,910,141 B2
DATED : June 21, 2005
INVENTOR(S) : Robert Maher et al.

It is certified that error appears in the above-identified patent and that said Letters Patent is hereby corrected as shown below:

Column 14,
Line 18, delete "port" and insert -- portion --.
Line 19, delete "on".

Column 15,
Lines 21 and 59, delete "portion" and insert -- portions --.
Line 39, delete "lock" and insert -- clock --.
Line 64, delete "couple" and insert -- coupled --.

Column 18,
Line 13, after "assertion" delete "state" and insert -- states, --.
Line 21, delete "portion" and insert -- portions --.
Line 39, delete "lock" and insert -- clock --.
Line 46, delete "of" and insert -- to --.
Line 64, after "instructions" and before "pro-" insert -- to --.
Line 66, delete "couple" and insert -- coupled --.

Column 21,
Line 19, delete "cycle" and insert -- cycles --.
Line 26, before "at" insert -- to --.
Line 46, delete "lock" and insert -- clock --.
Line 51, delete "a" and insert -- to --.
Line 52, delete "n" and insert -- an --.
Line 55, delete "de-assert on" and insert -- de-assertion --.

Column 22,
Line 4, after "instructions" and before "pro-" insert -- to --.
Line 6, delete "couple" and insert -- coupled --.
Line 8, delete "su sequent" and insert -- subsequent --.

UNITED STATES PATENT AND TRADEMARK OFFICE
CERTIFICATE OF CORRECTION

PATENT NO. : 6,910,141 B2
DATED : June 21, 2005
INVENTOR(S) : Robert Maher et al.

It is certified that error appears in the above-identified patent and that said Letters Patent is hereby corrected as shown below:

Column 23,
Line 32, delete "instruction" and insert -- instructions --.

Column 24,
Line 22, delete "cycle" and insert -- cycles --.

Column 25,
Lines 30 and 37, delete "instruction" and insert -- instructions --.

Column 26,
Line 11, delete "coming" and insert -- incoming --.
Line 24, delete "instruction" and insert -- instructions --.

Column 27,
Line 29, delete "de-assert on" and insert -- de-assertion --.
Line 33, delete "of" and insert -- to --.
Line 36, delete "sign" and insert -- signal --.
Line 39, delete "an" and insert -- and --.

Column 28,
Lines 6 and 13, delete "d".

Signed and Sealed this

Sixth Day of September, 2005

JON W. DUDAS
*Director of the United States Patent and Trademark Office*

UNITED STATES PATENT AND TRADEMARK OFFICE
CERTIFICATE OF CORRECTION

PATENT NO. : 6,910,141 B2
DATED : June 21, 2005
INVENTOR(S) : Maher et al.

It is certified that error appears in the above-identified patent and that said Letters Patent is hereby corrected as shown below:

Title page,
Item [*] Notice, delete "by 0 days" and insert -- by 3 days --.

Signed and Sealed this

Eighteenth Day of April, 2006

JON W. DUDAS
*Director of the United States Patent and Trademark Office*